(12) United States Patent
Neet et al.

(10) Patent No.: US 9,077,218 B2
(45) Date of Patent: Jul. 7, 2015

(54) ALTERNATOR BRUSH HOLDER

(75) Inventors: Kirk Neet, Pendleton, IN (US); Scott Bitzer, Fishers, IN (US)

(73) Assignee: Remy Technologies, LLC, Pendleton, IN (US)

( * ) Notice: Subject to any disclaimer, the term of this patent is extended or adjusted under 35 U.S.C. 154(b) by 629 days.

(21) Appl. No.: 13/404,598

(22) Filed: Feb. 24, 2012

(65) Prior Publication Data
US 2013/0221796 A1 Aug. 29, 2013

(51) Int. Cl.
*H01R 39/38* (2006.01)
*H01R 39/42* (2006.01)
*H01R 39/40* (2006.01)
*H01R 39/36* (2006.01)
*H02K 5/14* (2006.01)

(52) U.S. Cl.
CPC ...................................... *H02K 5/141* (2013.01)

(58) Field of Classification Search
CPC ........... H02K 5/14; H01R 39/38; H01R 39/00
USPC .......................... 310/239, 240, 245, 247, 249
See application file for complete search history.

(56) References Cited

U.S. PATENT DOCUMENTS

| | | | |
|---|---|---|---|
| 4,389,588 A | 6/1983 | Rankin | |
| 4,959,576 A * | 9/1990 | Horibe et al. | 310/239 |
| 6,294,856 B1 * | 9/2001 | Ishida et al. | 310/232 |
| 7,352,091 B2 | 4/2008 | Bradfield | |
| 7,982,357 B2 | 7/2011 | Harris et al. | |
| 2004/0080231 A1 * | 4/2004 | You | 310/239 |
| 2006/0273685 A1 * | 12/2006 | Wada et al. | 310/239 |
| 2009/0189478 A1 | 7/2009 | Wada et al. | |

* cited by examiner

*Primary Examiner* — Jose Gonzalez Quinone
(74) *Attorney, Agent, or Firm* — Bose McKinney & Evans LLP

(57) ABSTRACT

A brush holder assembly for an alternator having a rotational axis includes a pair of brushes each having a contacting surface defining a width and a height, and each having a shunt wire extending laterally from the brush in the widthwise direction. The brush holder assembly includes a housing having first and second brush chambers, corresponding first and second wire cavities each defining a cavity height, and first and second slots respectively interposed between the corresponding chamber and cavity. The respective shunt wires extend through the first and second slots then through the first and second wire cavities. The cavity heights are each at least approximately 0.9 times the height of one of the brushes. The height of the first wire cavity is less than approximately 0.97 times ((A/2) plus B), wherein A is the brush height and B is the distance between the brushes.

9 Claims, 5 Drawing Sheets

ALTERNATOR BRUSH HOLDER

BACKGROUND

The present invention relates generally to an alternator brush holder assembly and, more particularly, to improved reliability for a spring type brush assembly.

Dynamo electric machines such as generators, motors, and automotive alternators may include brushes that provide electrical communication between a spinning rotor and other components of an electric machine circuit. Brushes are typically composed of carbon and graphite materials. When part of a rotor circuit, the brushes may be contained in a brush holder assembly that include springs which cause the brushes to maintain firm contact with electrically conductive rotating portions of a rotor. In a typical alternator, two slips rings are located on one end of the rotor assembly and are respectively connected to opposite ends of the rotor field winding. The corresponding pair of brushes is typically positioned to be urged by the springs against the rotating slip rings.

The rotor of an automotive alternator is typically driven by a belt and pulley system to rotate within stator windings coiled on a laminated iron frame. The magnetic field from the spinning rotor induces an alternating current into the stator windings. The alternating current (AC) voltage is typically then converted to a direct current (DC) voltage by diode rectifiers that output the DC voltage to one or more batteries and to electrical devices of a vehicle. Associated apparatus may include a regulator and a controller for, among other things, monitoring battery voltage and current going to the field winding of the rotor. The DC output voltage may be, for example, 14 volts, which is generally at least one volt more than a conventional vehicle's battery voltage, for example 12.7 volts. The field winding current for conventional automobile alternators may be as much as 5-8 amps, and ambulances, buses, semi-tractors and various vehicles may require more current, for example, for powering air-conditioning, heaters, lights, refrigeration units, etc. while a vehicle is idling.

Electrical communication between an electricity source and a brush may be provided by a braided or twisted wire having one end connected to the brush and the other end connected to the electrical source via one or more electrical terminals. Such wire is often termed a shunt or shunt wire by those skilled in the art. Some conventional brushes have a shunt wire protruding from the rear of the brush through the center of a spring. This can be problematic because the shunt can tangle with the spring when the brush spring is compressed. A tangled shunt may cause the brush to become stuck, resulting in removal of field current from the alternator. In such a case, no electrical output is produced by the alternator. Other conventional brushes have a shunt protruding from the top/bottom of the brush. However, with a non-symmetrical brush, such as a brush having an angled front contacting surface, this configuration is undesirable because the negative and positive brushes are required to be different parts. For example, the shunt may protrude from the top of a negative brush and from the bottom of a positive brush.

SUMMARY

It is therefore desirable to obviate the above-mentioned disadvantages by providing a brush holding assembly with shunt wires that do not become self-entangled and/or that do not become bent due to contact with the sides of a shunt wire cavity. Conventional alternator brush structures that exit respective shunt wires from the top and bottom, in a same general direction as the center shaft, add unwanted height to the corresponding brush assembly, whereas the presently disclosed embodiments minimize overall brush assembly height by use of a pair of side-exit brushes. Without further improvement, however, the use of side-exit brushes may have a problem where the shunt wires have tight bends and become self-entangled. It is therefore an advantage of the disclosed embodiments to provide sufficient space so that shunt wires do not have tight bends. The embodiments provide adjacent shunt wire cavities of sufficient size in order to maximize shunt wire space, while still providing an assembly that can use a single brush style in either brush location. The embodiments described herein reduce or prevent tangling, bending, and stressing (tension/torsion) of a shunt wire that may cause failure of an automotive alternator. For example, if a shunt wire becomes damaged, caught, bent, and/or self-entangled, it may become compressed and transfer the compression force to a brush, causing the brush to become stuck. By implementing the disclosed structure, such unwanted biasing of a brush and unwanted stressing of a shunt wire are prevented.

According to an embodiment, a brush holder assembly for an alternator having a rotational axis includes a pair of brushes each having a contacting surface defining a width and a height, the height extending in a direction approximately parallel to the rotational axis, and each having a shunt wire extending laterally from the brush in the widthwise direction. The brush holder assembly has a housing having first and second brush chambers, corresponding first and second wire cavities each defining a cavity height extending in a direction substantially parallel to the rotational axis, and first and second slots respectively interposed between the corresponding chamber and cavity. The respective shunt wires extend through the first and second slots then through the first and second wire cavities. The cavity heights of the first and second wire cavities are each at least approximately 0.9 times the height of one of the brushes.

According to an embodiment, the height of the first wire cavity is less than approximately 0.97 times ((A/2) plus B), where A is the brush height and B is the distance between the brushes.

According to an embodiment, an alternator brush holder assembly defines perpendicular y and z axes, the z-axis extending substantially parallel to a rotational shaft of an alternator. The assembly includes first and second brushes each having a shunt wire protruding from a lateral side of the brush, and a housing having: first and second brush chambers each extending approximately parallel with the y-axis and having the first and second brushes disposed therein; first and second wire cavities extending from a brush-forward portion to a wire exit portion, the first wire cavity defining a centerline that extends in a direction forming an angle α with the z-axis; and first and second slots respectively connecting the first and second wire cavities with the first and second brush chambers. The first and second shunt wires extend laterally through the respective first and second slots and then through the respective first and second wire cavities. The first wire cavity has a z-axis dimension of Z, whereby the length of the first wire cavity is Z·(secant α).

According to an embodiment, a brush holder assembly for an alternator having a rotational axis includes a pair of brushes each having a contacting surface defining a width and a height, the height extending in a direction approximately parallel to the rotational axis, and each having a shunt wire extending from the brush in the widthwise direction. The brush holder assembly includes a housing having first and second brush chambers, corresponding first and second wire cavities each defining a cavity height extending in a direction substantially parallel to the rotational axis, and first and second slots respectively interposed between the corresponding chamber and cavity. The brush holder assembly includes a pair of springs disposed in respective ones of the brush chambers for biasing the brushes toward the respective contacting surfaces. The respective shunt wires extend through the first and second slots then through the first and second wire cavities, the cavity heights of the first and second wire cavities are each at least approximately 0.9 times the height of one of the brushes, the height of the first wire cavity is less than approximately 0.97 times ((A/2) plus B), where A is the brush height and B is the distance between the brushes, and the distance B is approximately the same as the height of one of the brushes.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
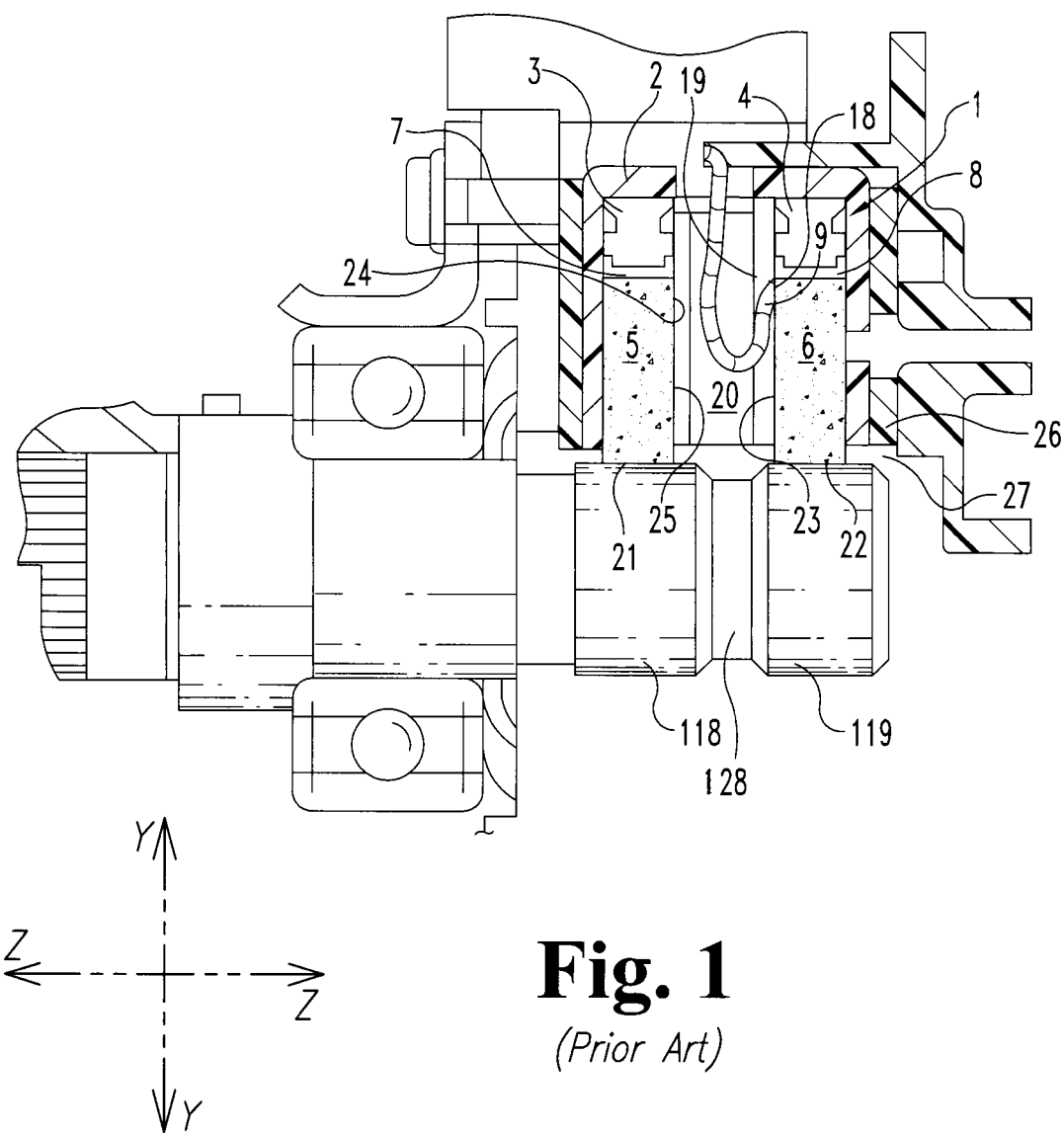
FIG. 1 is a schematic view of a portion of a conventional vehicle alternator that includes a brush assembly.

FIG. 1 is an enlarged sectional schematic view of a portion of a conventional vehicle alternator that includes a brush assembly 1. Brush assembly 1 includes a housing 2 made of thermosetting resin and formed to have two separate brush chambers 3, 4 for accommodating corresponding brushes 5, 6 therein. Constant force springs 7, 8 are respectively located inside chambers 3, 4 for urging brushes 5, 6 outward so that brush contacting ends 21, 22 are in abutment with slip rings 118, 119 attached to and concentric with the shaft 128. Slip rings 118, 119 are electrically connected to opposite ends of the rotor coil (not shown) of the alternator. Brush 6 has a first shunt wire 9 electrically connected thereto and extending from a shunt connection location 18 along a brush bottom surface 23, through a slot 19 and into a wire cavity 20. Similarly, brush 5 has a second shunt wire (not shown) electrically connected thereto at a shunt connection location 24 along a brush top surface 25 and extending out into a wire cavity (not shown) that is separate from wire cavity 20. A sealing member 26 may be provided at selected locations for preventing contamination of brush assembly 1. In order to vent dust and powder created by wearing of brushes 5, 6, ventilation holes 27 may be provided in housing 2 in locations where the various interior portions of brush assembly will still be protected from becoming wet when the alternator is installed in a vehicle. The present inventors have determined that shunt wire 9 may become entangled and/or bent when wire cavity 20 lacks sufficient space. In addition, brushes 5, 6 respectively have top and bottom shunt configurations, which necessitates stocking two separate brushes. Further, installation of brushes 5, 6 may be difficult because the respective brush orientations are different.

Figure 2:
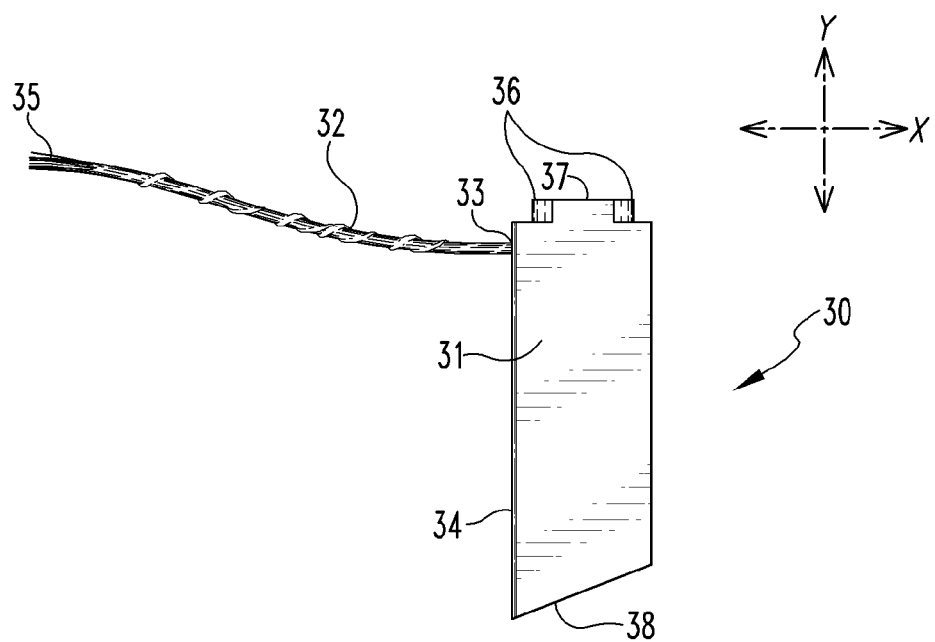
FIG. 2 is top view of a brush having a side-exit shunt wire.

FIG. 2 shows a brush 30 having a body portion 31 and a shunt wire 32 attached thereto at a shunt connection location 33 along lateral edge 34. For example, brush 30 may be formed of graphite and/or carbon, and may contain wear-resistant materials. Shunt wire 32 is typically formed of a woven copper braid. Spring engagement portions 36 are formed on the rear end 37 of brush 30 so that brush 30 consistently mates with a spring when installed into a brush holder assembly. The distal end 35 of shunt wire 32 may be terminated with a terminal or with a connector (not shown) for electrical communication with an electrical supply such as a vehicle battery. Brush 30 may have an angled and/or curved front contacting surface 38 in order to reduce chatter that might otherwise occur when surface 38 is in contact with rotating slip rings. Brush 30 may include a lubricant (not shown) for reducing and/or ameliorating the friction between brush 30 and a slip ring of the alternator. Powder and dust created by such friction may be exhausted during operation, in a space in front of the brushes. During operation in an automotive alternator, brush 30 wears very slowly and correspondingly travels very slowly so that shunt wire 32 is slowly extended and is typically not likely to experience fatigue under normal temperature conditions.

Figure 3:
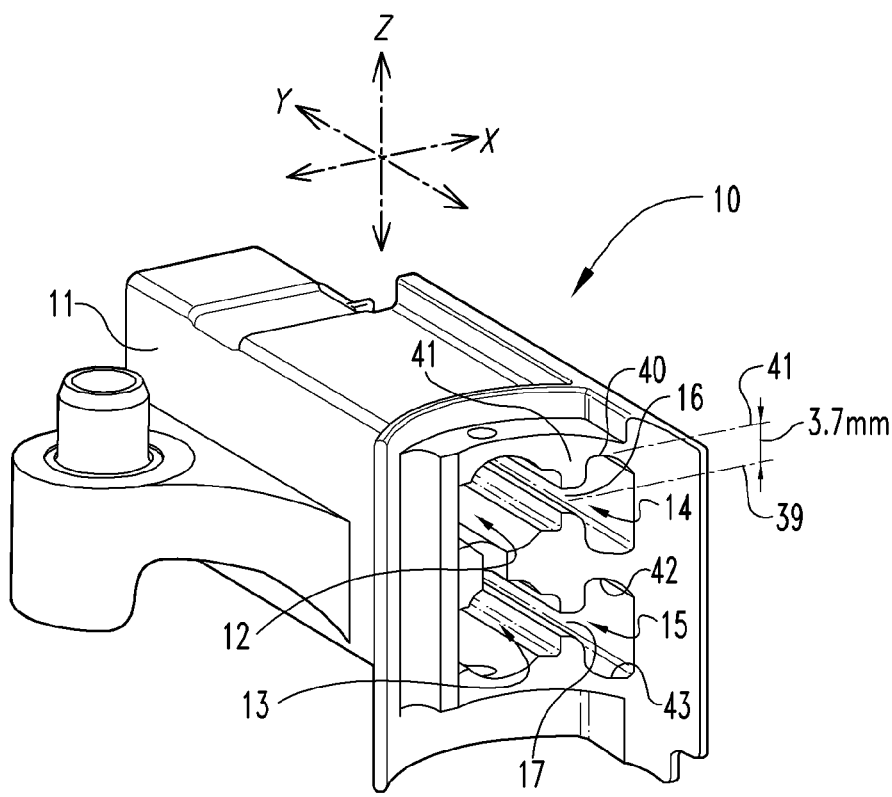
FIG. 3 is a perspective view of a brush holder assembly.

FIG. 3 illustrates an exemplary brush holder assembly 10, shown prior to installation of brushes 30. Brush assembly 10 has a body portion 11 made of polyphenylene sulfide (PPS), polypropylenes comprising 20 to 40% of talc as filler (PPT), and/or other plastics or copolymers or blends thereof, and/or including nylon and/or a thermosetting polymer such as epoxy, polyimide, polyester, and the like. Since there is relatively little heat being internally generated in brush assembly 10, the plastic or other material of body 11 is typically specified for withstanding heat being generated from ancillary elements, for example rectifier diodes. A pair of brush chambers 12, 13 is provided for accommodating a corresponding pair of brushes (not shown in FIG. 3) therein. Brush chambers 12, 13 are respectively connected to wire cavities 14, 15 via slots 16, 17. Cavities 14, 15 each have a symmetrical profile with a cavity height of 3.7 mm measured, for example, from the centerline 39 of the shunt connection 33, corresponding to a midpoint of slot 16, to one end 40 of cavity 14 and represented in FIG. 3 as end line 41. In such a case, the distance between the top 42 and bottom 43 ends of each cavity 14, 15 is typically 7.4 mm, and wire cavities 14 and 15 are thus of approximately the same height. In this symmetrical form, top 42 and bottom 43 ends of cavity 15 are each equidistant from centerline 39. When assembled, brush assembly 10 has two brush portions 30 each having a respective shunt wire 32 protruding from a lateral side of the brush and extending laterally into a shunt wire cavity 14, 15 via slot 16, 17. As noted below, the height dimension relates generally to the Z-axis. The cavity heights (in a direction paralleling the Z-axis) of the wire cavities 14, 15 are each at least approximately 0.9 times the height of a brush 30 slidably received in brush chamber 12 or 13, as shown in FIG. 3, where it can also be seen that the distance between brushes 30 received into brush chambers 12, 13 is approximately the same as the height of one of the brushes. For each of the brush portions, the respective heights of the slot and cavity are centered with a centerline of the shunt wire connection to the side of the brush. Although such structure may allow the same 'lateral edge shunt' type brush 30 to be used in both cavities 14, 15 and there are no tangling problems with a spring, brush assembly 10 may still be subject to failure from self-tangling and/or bending of shunt wires 32. Such tangling and/or bending may be caused by the extreme vibrations that can occur in an environment of an automotive alternator, and the vibration may causes brushes 30, and shunt wires 32, to bounce. This dynamic vibration effect may result in increasing torsion of a brush 30 when shunt wire 32 is bound, kinked, or otherwise restrained.

As shown in FIG. 2, the width dimension and a lateral or sideways direction relate to the X-axis of brush 30, and the depth dimension relates generally to the Y-axis of brush 30. The height dimension relates generally to the Z-axis, shown by example in FIG. 1 being in parallel with the center axis of an alternator shaft 128. Typically, the length of a shunt wire cavity refers to the longest dimension in a cross-sectional view, or a portion thereof.

Figure 4:
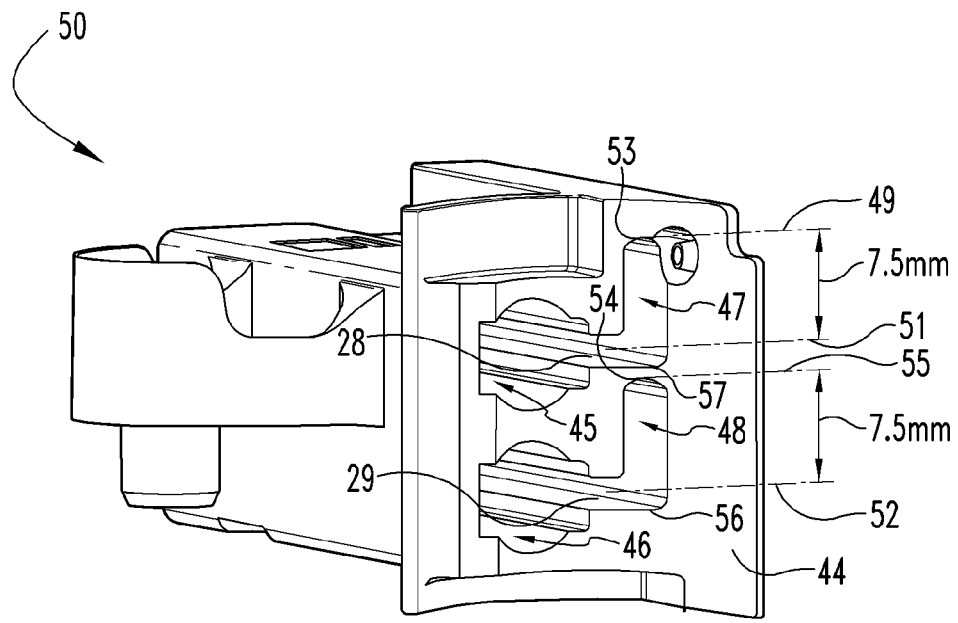
FIG. 4 is a perspective view of a brush holder assembly according to an exemplary embodiment.

FIG. 4 illustrates an exemplary brush holder assembly 50 having a body portion 44 made of materials described above for body portion 11, shown prior to installation of brushes. A pair of brush chambers 45, 46 is provided for accommodating a corresponding pair of brushes (not shown in FIG. 4) therein. Brush chambers 45, 46 are respectively connected to wire cavities 47, 48 via slots 28, 29. Wire cavity 47 has an asymmetrical profile with a cavity height of at least 7.5 mm measured from centerline 51 of the shunt connection 33, corresponding to the midpoint of slot 28, to the top end 53 of cavity 47, represented in FIG. 4 as end line 49. Wire cavity 48 has an asymmetrical profile with a cavity height of at least 7.5 mm measured from centerline 52 of the shunt connection 33, corresponding to the midpoint of slot 29, to the top end 54 of cavity 48 and represented in FIG. 4 as end line 55. When wire cavities 47, 48 have the same height, the distance, for example, between the top 54 and bottom 56 ends of cavity 48, and between the top 53 and bottom 57 ends of cavity 47 are each typically at 8.5 mm, and wire cavities 47 and 48 are thus of approximately the same height. When assembled, brush assembly 50 has two brush portions each having a respective shunt wire 32 protruding from a side of the brush and extending laterally into a shunt wire cavity 47, 48 via slot 28, 29. The extra room provided by the asymmetrical cavity arrangement greatly reduces the dynamic effects of vibration, as evidenced by environmental testing. As noted above, the height dimension relates generally to the Z-axis. The cavity heights (in a direction paralleling the Z-axis) of the wire cavities 47, 48 are each at least approximately 0.9 times the height of a brush 30 slidably received in brush chamber 45 or 46, as shown in FIG. 4, where it can also be seen that the distance between brushes 30 received into brush chambers 47, 48 is approximately the same as the height of one of the brushes.

Figure 6:
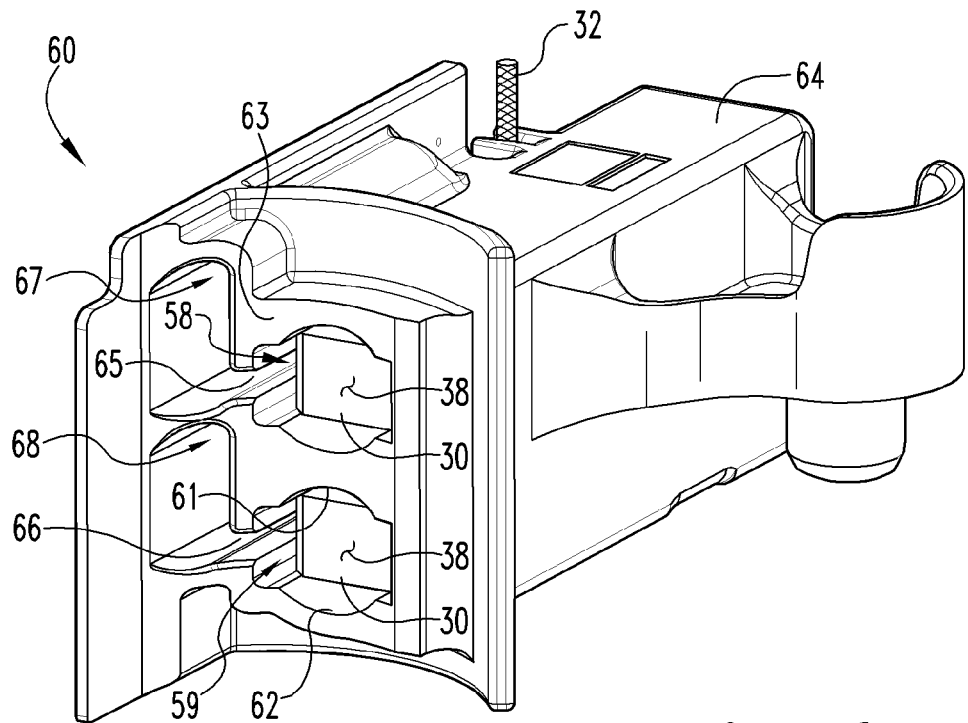
FIG. 6 is a cutaway perspective view of the brush holder assembly of FIG. 5.
Figure 5:
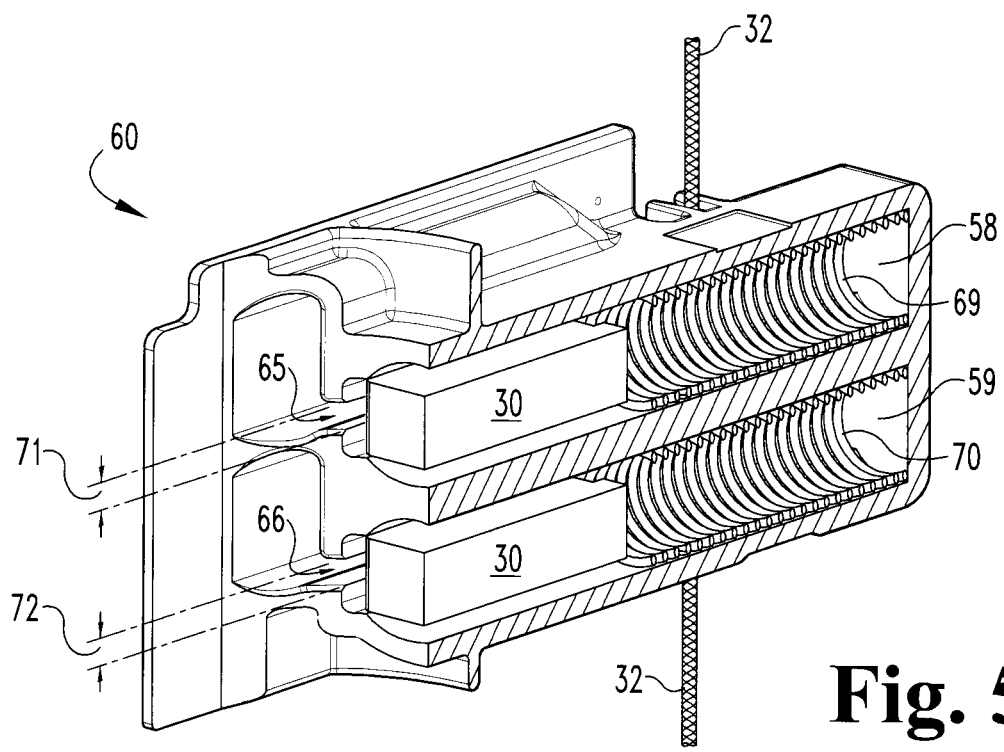
FIG. 5 is a perspective view of a brush holder assembly according to an exemplary embodiment.

FIG. 5 shows a brush assembly 60 having a brush 30 enclosed in each brush chamber 58, 59. Each brush chamber 58, 59 has a rounded top portion 61 and a rounded bottom portion 62 (see, e.g., FIG. 6) so that springs 69, 70 may be installed prior to installing brushes 30. The contacting surfaces 38 of respective brushes 30 may be angled and/or curved (e.g., FIG. 2), and the outer face 63 of housing 64 may be angled/curved in correspondence with the shapes of such contacting surfaces 38. The springs urge brushes 30 outward and into engagement with the slip rings of an alternator, and brush chambers 58, 59 are formed to allow brushes 30 to easily slide outward of surface 63 as they wear from friction. Shunt wires 32 of brushes 30 extend laterally through respective slots 65, 66 into respective wire cavities 67, 68. Since wire cavities 67, 68 are each disposed to one widthwise side of brush chambers 58, 59, brushes 30 having an angled contacting surface may be used in either brush chamber, thereby eliminating the need for stocking and installing two separate brushes. Each wire cavity 67, 68 extends essentially in only one height-wise direction, thereby reducing tangling of the corresponding shunt wires 32 while minimizing the overall height of housing 64. The shunt wires 32 move more easily in the one-sided cavities 67, 68, which allow for efficient packing of the respective shunt wires 32 during brush travel. The resultant reduction in binding and in tension on shunt wires 32 also facilitates the smooth movement of brushes 30 because such reduces lateral forces being applied to brushes 30. Shunt wire 32 of the top brush 30 exits the top of housing 64, and shunt wire 32 of the bottom brush 30 exits the bottom of housing 64, as shown by example in FIG. 6.

Figure 7:
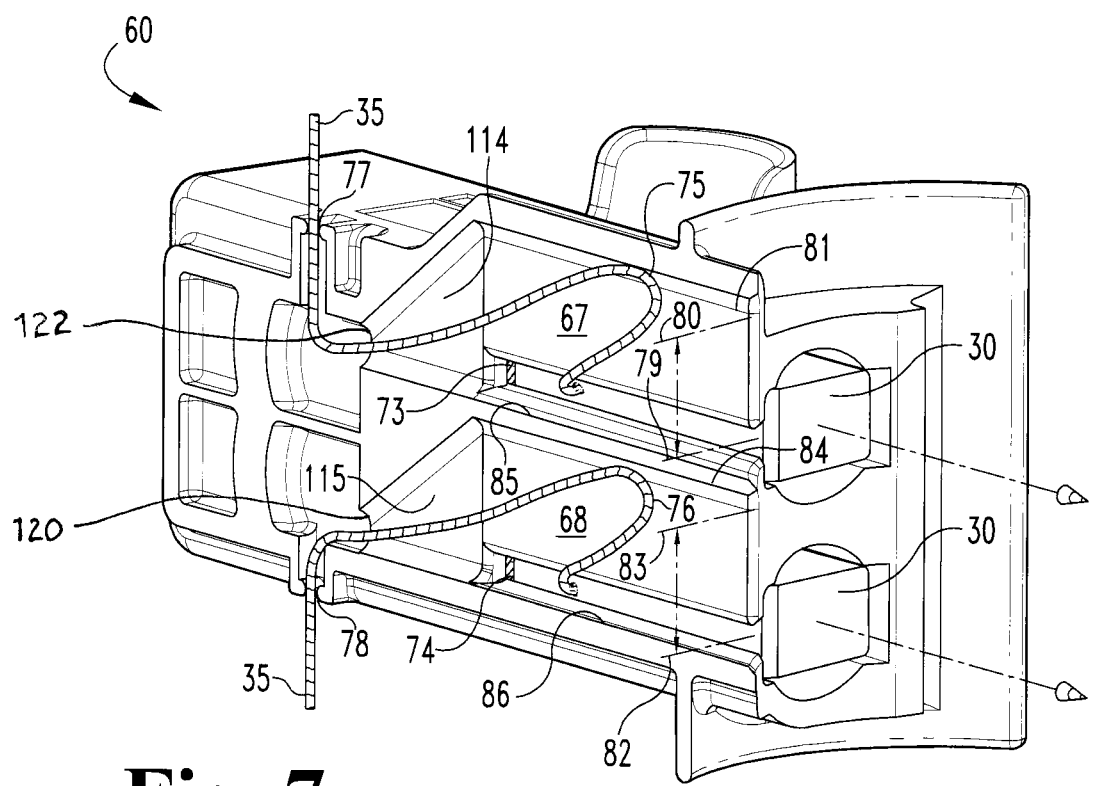
FIG. 7 is another cutaway perspective view of the brush holder assembly of FIG. 5.

FIG. 5 and FIG. 7 are cutaway views of an exemplary brush assembly 60. Constant force springs 69, 70 fit inside respective brush chambers 58, 59 and are configured to expand and contract therein. The diameter of springs 69, 70 is typically selected to minimize vibration or unintended movement during alternator operation, while also assuring freedom of springing movement. Springs 69, 70 mate with spring engagement portions 36 (e.g., FIG. 2) of brushes 30 to urge brushes 30 into engagement with the slip rings. Respective heights 71, 72 of slots 65, 66 are sufficient to allow respective shunt wires 32 to slide there-along but not so great as to provide a possibility of shunt wires 32 coming in contact with exposed spring portions 73, 74. During installation, the respective ends 35 of shunt wires 32 are inserted into exit holes 77, 78, and may be grasped gently at respective bend locations 75, 76 to insure uniformity of wire routing through cavities 67, 68 when bends 75, 76 are placed at a predetermined location. Bends 75, 76 are typically gradual in shape to avoid kinking and may be pre-formed. Wire cavity 67 has an asymmetrical profile with a cavity height of at least 7.5 mm—measured from centerline 79 of the shunt connection 33, corresponding to the midpoint of slot 65, to the top end 81 of cavity 67, represented in FIG. 7 as end line 80. Wire cavity 68 has an asymmetrical profile with a cavity height of at least 7.5 mm—measured from centerline 82 of the shunt connection 33, corresponding to the midpoint of slot 66, to the top end 84 of cavity 68 and represented in FIG. 7 as end line 83. The distance between the top 81 and bottom 85 ends of cavity 67, and between the top 84 and bottom 86 ends of cavity 68 are each typically at least 8.5 mm. Tapered portions 114, 115 help guide the two respective shunt wire ends 35 toward shunt exit holes 77, 78 during assembly. The length of a shunt wire cavity may therefore be referred-to as being a nominal value, because such tapered portions have a cavity length in the height-wise direction that decreases as the cavity approaches the respective wire exit port 120, 122. In order to maximize the available cavity room, the portion of body 44 between cavities 67, 68 is typically minimized.

The embodiment of brush assembly 60 may be generically described as having a pair of essentially single-sided asymmetrical wire cavities 67, 68, each having a z-axis height (measured, for example, from the centerline 79 of the shunt-brush connection 33 to the long end 81 of the cavity) that is at least 0.9 times the z-axis height of brush 30. So that bottom cavity 68 does not run into top cavity 67, the height of bottom cavity 68 (for a bottom wire cavity extending parallel to the z-axis) is typically less than 0.97 times (half the z-axis height of brush 30, plus the z-axis height between the two brushes 30). Since it is desirable to maintain a distance of approximately one brush height between the two brushes 30, the upper limit for the height of bottom wire cavity 68 (when extending in parallel with the z-axis) becomes 1.45 times the height of brush 30.

Figure 8:
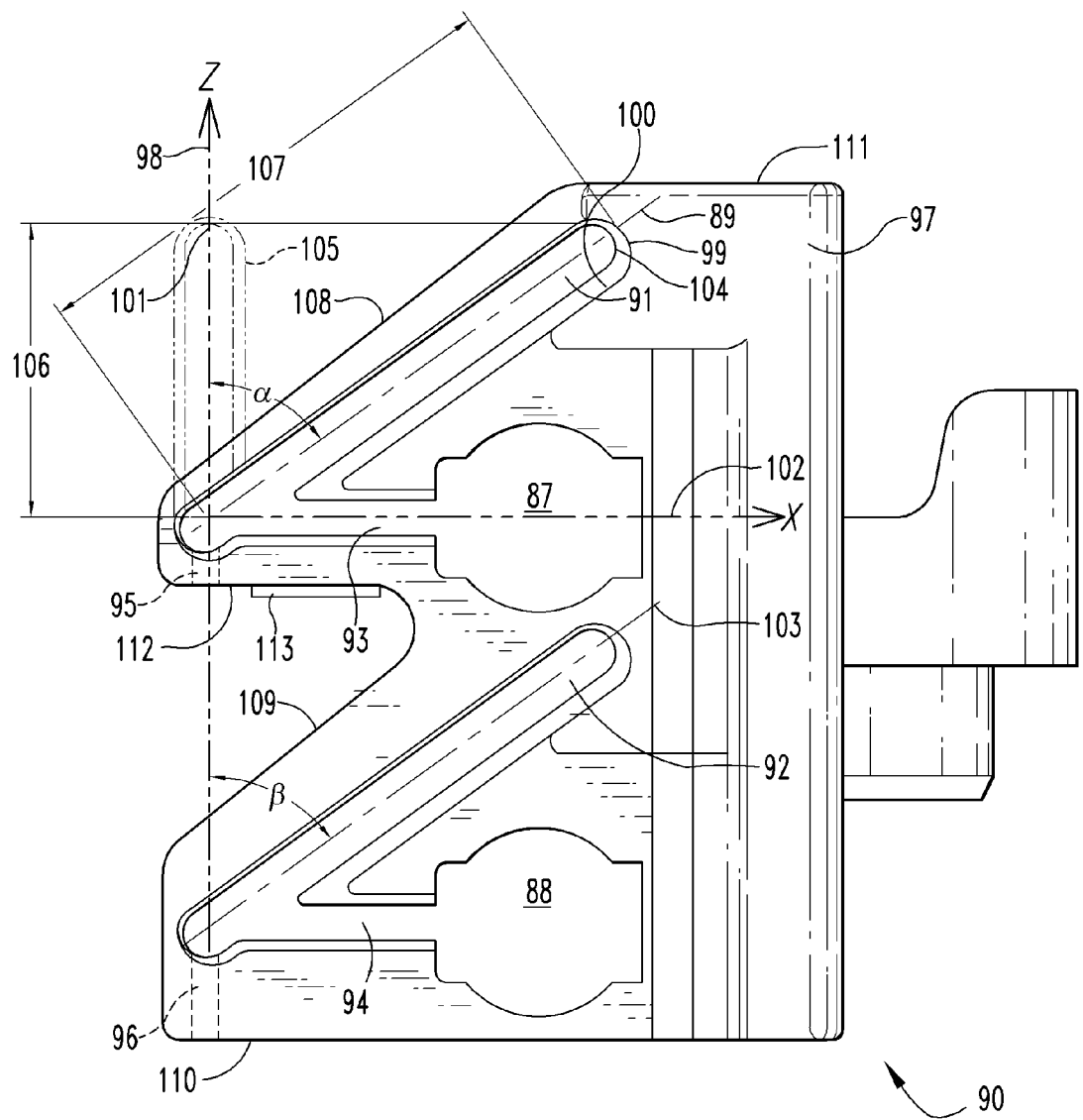
FIG. 8 is an enlarged front view of a brush holder according to an exemplary embodiment.

FIG. 8 is a front view of an exemplary brush holder assembly 90, shown before installation of brushes and springs into brush chambers 87, 88. Brush chambers 87, 88 are respectively connected to wire cavities 91, 92 via slots 93, 94. Wire cavities 91, 92 are each formed to be skewed at least with respect to z-axis 98. As shown, wire cavity 91 has a centerline 89 that extends at an angle α away from z-axis 98. Wire cavity 92 has a centerline 103 that extends at an angle β away from z-axis 98. Each wire cavity 91, 92 is defined by a surrounding volume of material integrally formed with body portion 97 that insulates the cavity spaces, and such surrounding material includes, for example, a barrier 100 formed at the end portion 99 of wire cavity 91. By forming wire cavity 91 at the skewed angle α, the distal end 104 of wire cavity 91 remains at a z-axis location 101 (c.f., embodiment of FIG. 5, shown as dashed portion 105), but the wire cavity length increases from the z-dimension 106 to the skewed wire cavity length 107. For example, when the length 106 measured from the centerline 102 (shown as the x-axis) of the brush-shunt connection 33 (e.g., FIG. 2) to the z-axis location 101 is Z, the skewed cavity length 107 from the intersection of z-axis 98 and x-axis 102 to the distal end 104 of wire cavity 91 is (Z·(secant α)). Thereby, the skewing of wire cavity 91 by an angle α substantially further increases the length thereof. For example, when Z=7.5 mm and α=30 degrees, the skewed cavity length 107 becomes (7.5·(secant 30))=8.7 mm. The same general analysis applies to the skewing of centerline 103 of cavity 92 at an angle β away from z-axis 98. Body portion 97 may be modified to reduce the body size by slanting a body portion 108 adjacent wire cavity 91 and by slanting a body portion 109 adjacent wire cavity 92, thereby removing significant body material and providing associated cost and space savings. Bottom shunt wire exit port 96 is located adjacent a bottom surface 110 of body portion 97. Top shunt wire exit port 95 may be located along an intermediate surface 112 provided by the skewing of wire cavity 92 and associated slanting of body portion 109. In such a case, an electrical terminal 113 for electrically communicating with a brush of brush chamber 87 may be located along intermediate surface 112 in proximity to wire exit port 95. Alternatively, wire exit port 95 may be located along body portion 108 or in proximity to a body top surface 111. By the described principles, an artisan may choose to provide a shunt wire exit for brush chamber 87 in either the same or in a generally opposite direction as the direction of wire exit port 95.

The various embodiments may advantageously enclose the portions of the wire cavities and the slots which are otherwise open along the brush contacting end of the body portion. For example, after brushes 30 have been installed, shunt wire ends 32 have been fed out of the wire exits, and the shunt wires 32 have been properly positioned within the wire cavities, the wire cavities and slots opening toward the brush contact end may be plugged such as by installing a seal, epoxy, or other material. Such plugging may keep unwanted brush powder, generated by friction of brushes 30 with the slip rings, and other debris, from entering the wire cavities. Alternatively, the body portion may be molded to eliminate these external openings for preventing exposure of the wire cavities near the brushes.

Various features and structure of exemplary brush assemblies 50, 60, 90, are not exclusive to the illustrated embodiments but may be selectively combined where appropriate for a given application. A brush holder assembly for a given application may be formed, in whole or in part, in any appropriate manner.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:

1. A brush holder assembly for an alternator having a rotational axis, comprising:
   a pair of brushes each having a contacting surface defining a width and a height, the height extending in a direction approximately parallel to the rotational axis, and each having a shunt wire extending laterally from the brush in the widthwise direction; and
   a housing having first and second brush chambers, corresponding first and second wire cavities each defining a cavity height extending in a direction substantially parallel to the rotational axis, and first and second slots respectively interposed between the corresponding chamber and cavity;
   wherein the respective shunt wires extend through the first and second slots then through the first and second wire cavities, and
   wherein the cavity heights of the first and second wire cavities are each at least approximately 0.9 times the height of one of the brushes.

2. The alternator brush holder assembly according to claim 1, wherein the height of the first wire cavity is less than approximately 0.97 times ((A/2) plus B), and wherein A is the brush height and B is the distance between the brushes.

3. The alternator brush holder assembly according to claim 2, wherein the maximum distance between opposing surfaces, for the first wire cavity, is approximately 1.45 times the height of the brush.

4. The alternator brush holder assembly according to claim 1, wherein the first and second wire cavities have approximately the same heights.

5. The alternator brush holder assembly according to claim 4, wherein the distance between the brushes is approximately the same as the height of one of the brushes.

6. The alternator brush holder assembly according to claim 1, further comprising a pair of springs disposed in respective ones of the brush chambers for biasing the brushes toward the respective contacting surfaces.

7. The alternator brush holder assembly according to claim 1, wherein the respective heights of the first and second wire cavities, measured from the centerline of connection between shunt wire and brush, are approximately 7.5 mm.

8. The alternator brush holder assembly according to claim 1, wherein the respective heights of the first and second wire cavities extend primarily only in one height-wise direction away from the respective slots.

9. A brush holder assembly for an alternator having a rotational axis, comprising:
   a pair of brushes each having a contacting surface defining a width and a height, the height extending in a direction approximately parallel to the rotational axis, and each having a shunt wire extending from the brush in the widthwise direction;
   a housing having first and second brush chambers, corresponding first and second wire cavities each defining a cavity height extending in a direction substantially parallel to the rotational axis, and first and second slots respectively interposed between the corresponding chamber and cavity; and a pair of springs disposed in respective ones of the brush chambers for biasing the brushes toward the respective contacting surfaces;

wherein the respective shunt wires extend through the first and second slots then through the first and second wire cavities;

wherein the cavity heights of the first and second wire cavities are each at least approximately 0.9 times the height of one of the brushes;

wherein the height of the first wire cavity is less than approximately 0.97 times ((A/2) plus B), wherein A is the brush height and B is the distance between the brushes; and wherein the distance B is approximately the same as the height of one of the brushes.

\* \* \* \* \*